United States Patent

[11] 3,548,070

| [72] | Inventor | Clarence G. Duenke |
| --- | --- | --- |
| | | St. Louis, Mo. |
| [21] | Appl. No. | 822,232 |
| [22] | Filed | May 6, 1969 |
| [45] | Patented | Dec. 15, 1970 |
| [73] | Assignee | A. B. Chance Company |
| | | Centralia, Mo. |
| | | a corporation of Missouri |

[54] POTHEAD WITH PRESSURIZED DIELECTRIC
9 Claims, 5 Drawing Figs.

[52] U.S. Cl. .................................................. 174/12, 174/19, 174/73
[51] Int. Cl. .............................................. H02g 15/02
[50] Field of Search ..................................... 174/12.3, 19, 20, 30, 31, 73, 74, 75, 75D, 80

[56] References Cited
UNITED STATES PATENTS
| 3,322,883 | 5/1967 | Lusk.............................. | 174/19X |
| 3,445,580 | 5/1969 | Lusk.............................. | 174/12(.3) |

FOREIGN PATENTS
| 880,275 | 10/1961 | Great Britain................ | 174/31 |

*Primary Examiner*—Laramie E. Askin
*Attorney*—Kingsland, Rogers, Ezell, Eilers & Robbins

ABSTRACT: A pothead for terminating and joining electrical conductors. A special pressurized dielectric excludes air from the cable-retaining section. A rubber tube having conductive and nonconductive sections eliminates undue stress on the cable insulation sheath, and a stress-relief cone reduces dielectric stress at the junction of the conductive and nonconductive cable sections.

PATENTED DEC 15 1970　　　　　　　　　　3,548,070
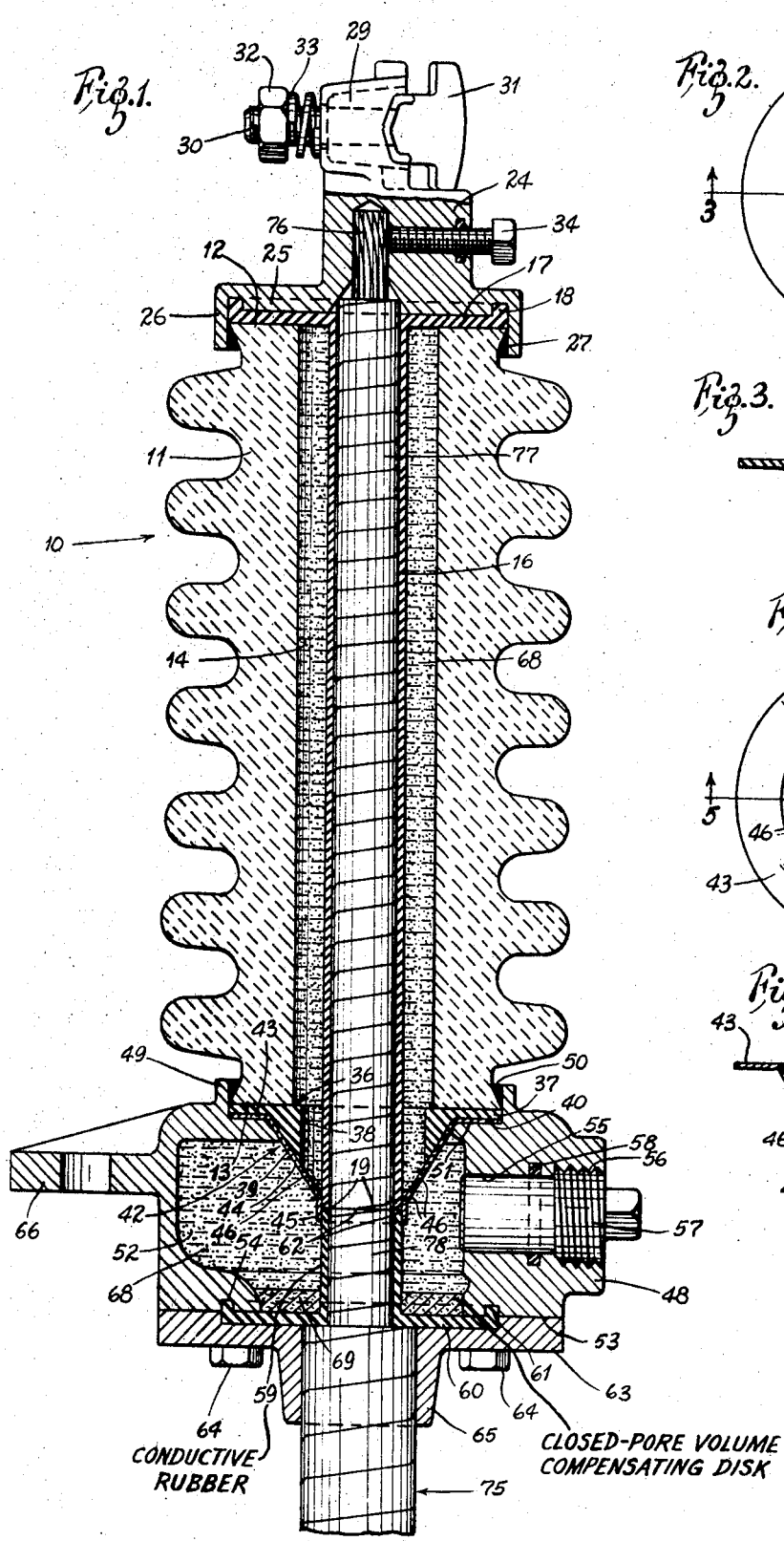
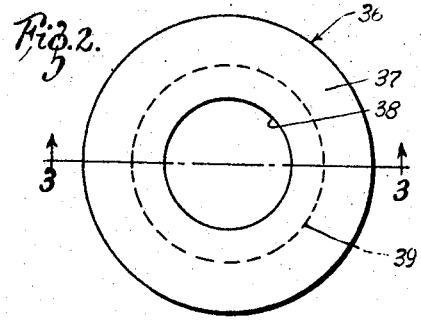
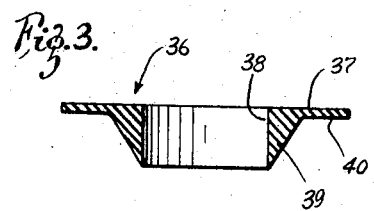
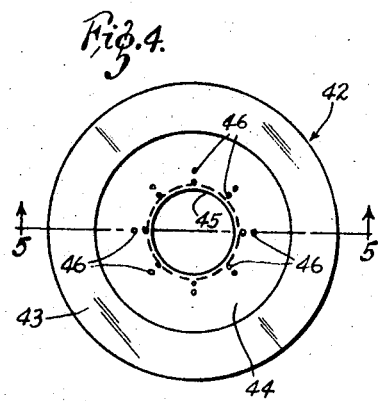
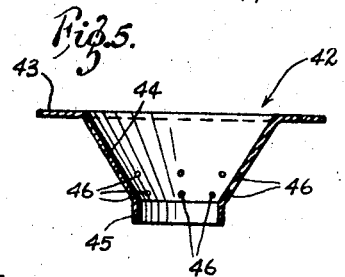
INVENTOR:
CLARENCE G. DUENKE
BY Kingsland, Rogers, Ezell, Eilers & Robbins
ATTORNEYS

POTHEAD WITH PRESSURIZED DIELECTRIC

BRIEF DESCRIPTION OF THE INVENTION

This pothead has a porcelain body that receives the insulated section of a cable. A rubber sealing tube surrounds the insulated section, and the space between the sealing tube and the porcelain body is filled with a special gaseous or granular, flowable dielectric. Tightening of a compression plug reduces the volume and therefore increases the pressure of the dielectric.

For the special dielectric, several gases are suitable, such as dry air helium, dry nitrogen, and FREON. Suitable liquids are mineral oil (transformer oil), silicone and polybutene. An elastomer can also be used such as polyurethane and silicone. Notice that silicone comes in both the liquid and solid form.

Underground cables and other installations of conductors require a termination which preserves the electrical integrity of the insulating covering of the cable. Excessive concentrations of dielectric stress must be avoided.

To prepare the cable for terminating, the operator removes all insulation from the central conductor core and either solders or swages the terminal stud onto the end of the cable. The outside jacket is then cut off to the predetermined length with the shielding tape removed and folded down at the end of the cable sheath. The cable is inserted into the hollow porcelain body of the pothead, and pressure is applied through a compressor plug to compress the dielectric and exclude air from between the inner tube and the cable. The special dielectric under pressure has the proper dielectric constant (specific inductive capacity) to prevent concentration of dielectric stress in the insulating core of the porcelain, and its dielectric constant forces the greater part of the dielectric field to appear in the porcelain.

The other requirement of the termination is to furnish an insulated terminal to connect to the cable. This is usually accomplished by using a combination of porcelain or other ceramic insulating material in which the lower sleeve of metal is fastened to the porcelain, either mechanically or by soldering. This lower sleeve is then used to seal against the sheath of the cable. In doing this, excessive concentration of dielectric stress is likely to occur at the juncture of the lead sheath and the insulated core. There are conventional ways to reduce this dielectric stress. One is to use a tape, the resistivity of which is in the conducting range rather than in the insulating range. This tape is then built up to form a tapered cone which distributes the dielectric stress at the end of the cable jacket.

The action of pressurizing the special dielectric squeezes out all air from between the sealing tube and the porcelain and from between the sealing tube and the cable. Any air trapped within this area, of course, will be highly stressed as to the dielectric field and will cause corona leading to both radio interference voltage and eventual breakdown of the dielectric.

This same principle can be used for preventing corona in the cable entrance of a transformer or any other type of application in which a cable must be connected to and voltage carried through the wall of a barrier or box.

BRIEF DESCRIPTION OF THE DRAWINGS

FIG. 1 is a view in longitudinal medial section through the axis of the pothead;
FIG. 2 is a top plan view of the gasket;
FIG. 3 is a view in section taken along the line 3—3 of FIG. 2.
FIG. 4 is a top plan view of the stress cone; and
FIG. 5 is a view in section taken along the line 5—5 of FIG. 4.

DETAILED DESCRIPTION OF THE INVENTION

The pothead 10 has a porcelain body 11 having upper and lower ends 12 and 13 and a central bore 14 through it. A tube 16 of nonconductive material, such as synthetic rubber, extends through the bore 14. The tube has a radially outwardly extending flange 17 overlying the upper end 12 of the body 11 and having a peripheral upwardly extending bead 18. The lower end 19 of the tube 16 is below the porcelain body 11.

A top cap of suitable conductive material, such as brass, bronze, aluminum or copper, has a base 25 that rests upon the flanged portion of the rubber tube 16 and has a downwardly extending annular skirt 26. The base 25 is recessed to receive the peripheral bead 18. Solder sealing 27 connects the annular skirt 26 to the porcelain body 11. The top cap 24 supports a connector 29 which is of the usual construction, having the stud 30 of an eye bolt 31 extending through it with a nut 32 tightenable against a spring lock washer 33 to secure the conducting end of a connecting conductor. A set screw 34 is threaded through the side of the top cap.

A gasket 36 of insulating material, shown in FIGS. 2 and 3, has an upper wall 37 that bears against the lower end 13 of the body 11. The gasket 36 has a cylindrical inner side 38 and a frustoconical outer wall 39. The upper periphery of the frustoconical wall 39 meets an annular horizontal wall 40.

A stress cone or corona shield 42 of conductive material rests against the gasket 36. As shown in FIGS. 4 and 5, the stress cone 42 comprises an upper annular flange 43, a frustoconical body 44, and a downwardly extending base ring 45. There are a plurality of small perforations 46 through the lower section of the frustoconical portion 44. The base ring 45 fits around the sealing tube 16.

A lower body or base 48 of conductive material, such as bronze, brass, aluminum or copper, has an upstanding flange 49 fastened to the porcelain body 11 by solder sealing 50. Below the flange 49, the lower body 48 has an inwardly extending horizontal shoulder 51 that bears against and supports the outer flange 43 of the stress relief cone 42. The lower body 48 has a hollow interior 52. The bottom wall 53 of the body 48 has an annular recess 54 formed in it.

A side of the lower body 48 has a bore 55 through it with an internally threaded section 56. A compression plug 57 of cast aluminum is threaded into the internally threaded section 56. An O-ring 58 provides a liquid or fluid seal. Another sealing tube 59 is made of conductive synthetic rubber. A lower wall 60 projects radially from the tube 59. The outer portion of the wall 60 rests against the lower wall 53 of the lower body 48, and the lower wall 60 has an upwardly extending peripheral bead 61 that fits within the annular recess 54. The upper end 62 of the tube section 59 abuts the lower end 19 of the tube section 16.

A cable guide 63 is fastened by machine screws 64 to the lower body 48 and clamps the annular flange 60 to provide a fluid seal. The cable guide 63 has a downwardly extending sleeve 65 that surrounds the shielded incoming cable 75. The lower body 48 may have an outwardly extending lug 66 for mounting purposes as is conventional.

A special dielectric 68 fills the area between the bore 14 and the sealing tube 16, and also fills the hollow interior 50 of the lower housing 46. The special dielectric is a flowable gas, liquid or granular insulator material. The special dielectric 68 is substantially incompressible so that when the compression plug 57 is threaded into the lower body 48 to reduce the total volume occupied by the dielectric, the pressure of the dielectric is increased. The dielectric flows through the holes 46 in the stress relief cone 42.

At the base of the area occupied by the special dielectric, there is a disc 69 made of a closed-pore compressible material. The disc 69 acts as a device for absorbing expansion and maintaining pressure of the special dielectric 68.

The use of this pothead is very convenient and easy, requiring no assembly in the field other than inserting a prepared cable 75 into the pothead after the cable has been properly stripped and prepared so that its uninsulated terminal stud 76 is positioned for clamping by the set screw 34, and its unshielded section 77 is within the sealing tube section 16. A shielded section 78 of the cable 75 extends from the lower wall 60 to the junction between the tube 59 and the tube 16 for stress control, with the base ring 45 of the corona shield 42 surrounding that junction. Tightening of the compression plug 57 applies pressure to the dielectric 68, which in turn presses the sealing tubes 16 and 59 against the cable sections 77 and 78.

The pressure of the special dielectric is also applied against the stress relief cone 42, tightly clamping the stress relief cone against the gasket 36. Thus, the flowable dielectric 68 causes all air to be excluded from between the cable sections 77 and 78 and the sealing tube sections 16 and 59. The corona shield 42 provides a conductor at the transition of the cable from conductive to insulating where excessive dielectric stress tends to be concentrated and spreads the stress lines away from the end of the conductive shield 78 and over a greater length of the cable.

Various changes and modifications may be made within the purview of this invention as will be readily apparent to those skilled in the art. Such changes and modifications are within the scope and teaching of this invention as defined by the claims appended hereto.

I claim:

1. A pothead comprising a body of insulating material receiving portions of a cable for termination thereof, flexible sleeve means between the body and the cable portions, a substantially noncompressible, flowable dielectric confined within the pothead and lying between the flexible sleeve means and the body, the dielectric being excluded from within the cable portions, and means attached to the body to pressurize the dielectric, thereby pressing the flexible sleeve means against the cable portions and expelling air from between the flexible sleeve means and the cable portions.

2. The pothead of claim 1 wherein the flowable dielectric comprises an elastomer.

3. A pothead comprising a body of insulating material receiving portions of a cable for termination thereof, the cable having an insulated and unshielded portion and having a shielded portion, flexible sleeve means between the body and the cable portions the flexible sleeve means having a tube of nonconductive material surrounding the insulated and unshielded portion and a tube of conductive material surrounding the shielded portion, the tubes abutting one another, flowable dielectric confined within the pothead and lying between the flexible sleeve means and the body, and means attached to the body to apply pressure to the dielectric to press the flexible sleeve means against the cable portions and expel air from between the flexible sleeve means and the portions.

4. The pothead of claim 3 including a corona shield of conductive material having a supporting base surrounding the juncture between the conductive and nonconductive tubes and a conical wall diverging from the base in a direction away from the conductive tube to relieve dielectric stress at the juncture between the conductive and nonconductive tubes.

5. The pothead of claim 4 including a conductive stud projecting from the insulated and unshielded portion of the cable and beyond the nonconductive tube, and conductive means supported by the body making electrical connection with the stud.

6. The pothead of claim 5 including an insulating separating wall between the body and the conductive means supported by the body, the insulating separating wall comprising a flange extending radially from the nonconductive tube.

7. The pothead of claim 4 including a base of conductive material supported by the body, the corona shield being located in the base.

8. The pothead of claim 7 wherein the means to apply pressure to the dielectric comprises a plug threaded into the base, the plug being adjustable to vary the volume occupied by the dielectric.

9. The pothead of claim 8 including a compressible disc in the base in contact with the dielectric to absorb expansion and maintain pressure of the dielectric.